C. A. ERICKSON.
SADDLE FOR RADIATORS.
APPLICATION FILED AUG. 9, 1919.

1,411,611.

Patented Apr. 4, 1922.

INVENTOR
Charles A. Erickson
BY
ATTORNEY

UNITED STATES PATENT OFFICE.

CHARLES A. ERICKSON, OF SPRINGVILLE, NEW YORK.

SADDLE FOR RADIATORS.

1,411,611.  Specification of Letters Patent.  Patented Apr. 4, 1922.

Application filed August 9, 1919. Serial No. 316,476.

*To all whom it may concern:*

Be it known that I, CHARLES A. ERICKSON, a citizen of the United States, and resident of Springville, in the county of Erie and State of New York, have invented certain new and useful Improvements in Saddles for Radiators, of which the following is a specification.

The invention relates to a mounting for securing an automobile radiator to its structural support on the machine and specifically relates to a combined radiator saddle and attaching stud for securing the same in place.

In such devices heretofore known the means for mounting the radiator involved some modification of the radiator body, such as the passing of bolts or rivets therethrough, giving rise to the possibility of leakage or in some other way modifying the structure of the tank thus adding to the cost of manufacture.

Accordingly, the primary object of this invention is to provide an economically constructed, secure and positive mounting for an automobile radiator which can be secured to the radiator without the necessity for using bolts or other means penetrating the side of the tank, and without modifying the tank structure.

Broadly, this object is attained by providing a saddle having a configuration designed to receive the bottom of the radiator and which, if desired, may be externally soldered thereto.

The invention further contemplates the use of a bolt stud usual in such mounting but differing from conventional structure in that the stud is formed integral with the saddle and has a length sufficient to extend through any desired thickness of the supporting frame.

Various other objects and advantages of the invention will be in part obvious from an inspection of the accompanying drawings and in part will be more fully set forth in the following particular description of one form of mechanism embodying my invention, and the invention also consists in certain new and novel features of construction and combination of parts hereinafter set forth and claimed.

Figure 1:
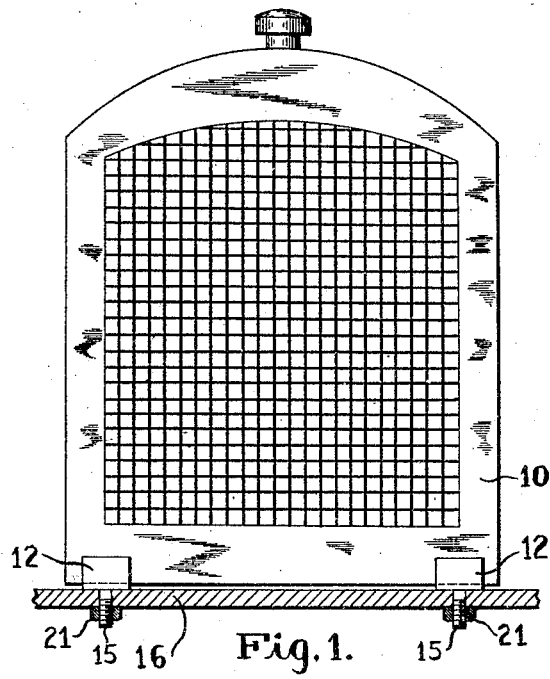
Figure 1 is a view in front elevation of an automobile radiator positioned on its support and fixed thereto by a pair of saddles, each illustrating a preferred embodiment of the invention.
Figure 2:
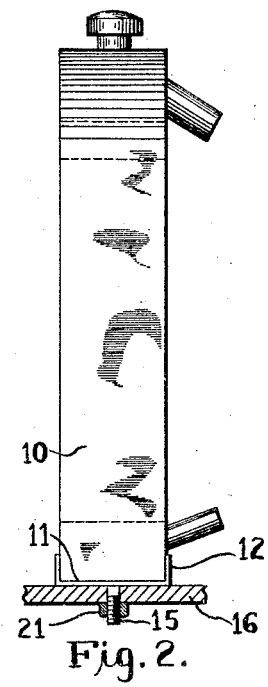
Figure 2 is a side view of the device shown in Figure 1.
Figure 3:
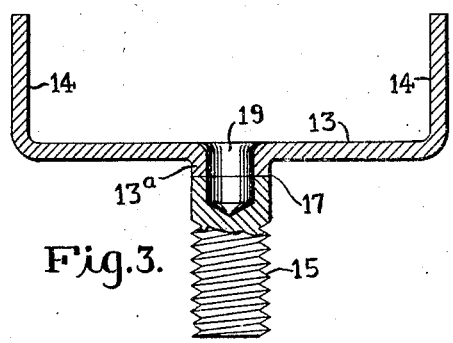
Figure 4:
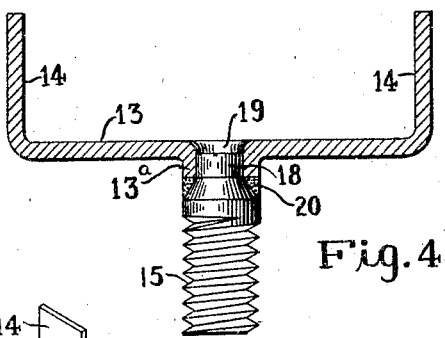
Figure 5:
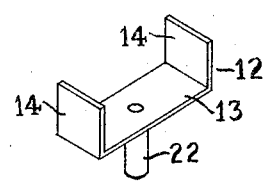

Figures 3 and 4 are each transverse sectional views of two forms of the saddles shown in Figures 1 and 2; and Figure 5 is a perspective view of an article of manufacture detached from the radiator, intended first to illustrate either of the forms in Figures 3 and 4 and second to illustrate a saddle in which the securing stud is not necessarily threaded.

In the drawings, there is shown a radiator 10 of conventional form having a flat bottom 11. The saddle 12 is of a form of a channel plate provided with a bottom 13 fitting flat against the bottom of the radiator and provided with upstanding sides 14 proportioned to extend up the sides of the radiator to any desired extent.

The bottom 13 of the plate is punched outwardly to form a boss 13ª in the form of a ring. This punched boss necessarily cannot be made sufficiently long to pass through the radiator support indicated by the board 16 in Figures 1 and 2 and accordingly a nipple 15 is secured thereto and coacts therewith to form a securing stud. The nipple may be secured to the stud either by an electric weld along the joint 17, as shown in Figure 3, or in the alternative, the nipple may be provided with a reduced head 18 fitted in the opening 19 formed by the boss and secured by an acetylene weld as shown at 20 in Figure 4.

The nipple may be screw threaded and engaged on the underside of the support by a nut 21 or may be an extension 22 as shown in Figure 5 designed to be otherwise secured as by welding to the support.

While I have shown and described, and have pointed out in the annexed claim, certain novel features of my invention, it will be understood that various omissions, substitutions and changes in the form and details of the device illustrated and in its operation may be made by those skilled in the art without departing from the spirit of the invention.

Having thus described my invention, I claim:

In combination with a flat bottom radiator tank for automobiles and a supporting frame therefore, of means for mounting the bottom of the tank on the frame, including a saddle in the form of a channel plate located outside of the tank and shaped to fit across the flat bottom and up the sides of the tank, said channel plate having a boss extending downwardly therefrom and integrally therewith, a threaded nipple integrally secured to said boss constituting an integral extension thereof and coacting therewith to form a securing stud constituting in effect a one-piece extension from and forming an integral part of the saddle for engaging said frame.

Signed at Springville, in the county of Erie and State of New York this 30th day of July, 1919.

CHARLES A. ERICKSON.